(12) United States Patent
Ishida

(10) Patent No.: US 9,004,617 B2
(45) Date of Patent: Apr. 14, 2015

(54) BRAKE DEVICE

(75) Inventor: Satoshi Ishida, Chiryu (JP)

(73) Assignee: Advics Co., Ltd, Kariya, Aichi-Pref. (JP)

( * ) Notice: Subject to any disclaimer, the term of this patent is extended or adjusted under 35 U.S.C. 154(b) by 237 days.

(21) Appl. No.: 13/696,818

(22) PCT Filed: May 19, 2011

(86) PCT No.: PCT/JP2011/061484
§ 371 (c)(1),
(2), (4) Date: Nov. 8, 2012

(87) PCT Pub. No.: WO2011/145673
PCT Pub. Date: Nov. 24, 2011

(65) Prior Publication Data
US 2013/0057054 A1 Mar. 7, 2013

(30) Foreign Application Priority Data

May 20, 2010 (JP) .................................. 2010-116274

(51) Int. Cl.
| B60T 13/14 | (2006.01) |
| B60T 7/04 | (2006.01) |
| B60T 8/40 | (2006.01) |
| B60T 13/66 | (2006.01) |
| B60T 13/68 | (2006.01) |

(52) U.S. Cl.
CPC ............... *B60T 7/042* (2013.01); *B60T 8/4077* (2013.01); *B60T 13/147* (2013.01); *B60T 13/662* (2013.01); *B60T 13/686* (2013.01); *B60T 2270/414* (2013.01); *B60T 2270/602* (2013.01); *B60T 2270/604* (2013.01)

(58) Field of Classification Search
USPC ............ 303/122.04, 122.05, 151, 152, 114.1, 303/155
See application file for complete search history.

(56) References Cited

U.S. PATENT DOCUMENTS

| 4,730,877 A | 3/1988 | Seibert et al. |
| 5,031,968 A | 7/1991 | Takata |

(Continued)

FOREIGN PATENT DOCUMENTS

| JP | 2-299962 A | 12/1990 |
| JP | 3-213701 A | 9/1991 |
| JP | 2006-264358 A | 10/2006 |

OTHER PUBLICATIONS

International Search Report (PCT/ISA/210) issued on Aug. 9, 2011, by the Japanese Patent Office as the International Searching Authority for International Application No. PCT/JP2011/061484.

(Continued)

*Primary Examiner* — Bradley King
(74) *Attorney, Agent, or Firm* — Buchanan Ingersoll & Rooney PC

(57) ABSTRACT

A brake device can prevent deterioration of braking force by applying a predetermined pressure in the drive hydraulic pressure chamber even when an electric system failure occurs. The brake device includes a stroke simulator portion, regulator, a first passage connecting the accumulator and the high pressure port of the regulator, a second passage connecting the reservoir tank and the low pressure port of the regulator, a third passage connecting the stroke simulator portion and the pilot pressure input port of the regulator, a fourth passage connecting the drive hydraulic pressure chamber and the output port of the regulator and a fifth passage connecting the accumulator and the drive hydraulic pressure chamber bypassing the high pressure port. The normally open type pressure decrease control valve is provided in the second passage or in the fourth passage whereas the normally closed pressure increase control valve is provided in the fifth passage.

7 Claims, 9 Drawing Sheets

(56) References Cited

U.S. PATENT DOCUMENTS

| | | | |
|---|---|---|---|
| 7,309,112 B2* | 12/2007 | Isono | 303/11 |
| 8,801,112 B2* | 8/2014 | Ishida | 303/114.2 |
| 2008/0257670 A1* | 10/2008 | Drumm et al. | 188/358 |
| 2010/0181825 A1* | 7/2010 | Drumm et al. | 303/122.13 |

OTHER PUBLICATIONS

Office Action issued on Jun. 5, 2013, by the Chinese Patent Office in corresponding Chinese Patent Application No. 201180023876.2. (5 pages).

* cited by examiner

BRAKE DEVICE

TECHNICAL FIELD

This invention relates to a brake device.

BACKGROUND OF THE TECHNOLOGY

As a conventional brake device, one example of such brake device has been known in in FIG. 1 of Patent Document 1, in which the brake device is shown. The brake device includes a drive hydraulic pressure chamber (dynamic pressure chamber 7) for driving a master piston (dynamic pressure piston 9), a high pressure source (dynamic pressure source 5) connected to the drive hydraulic pressure chamber and accumulating hydraulic pressure of brake fluid delivered from an electric pump by pumping, a low pressure source (reservoir 6) connected to the drive hydraulic pressure chamber and reserving pressure lower than the pressure accumulated in the high pressure source and a pressure modulating valve 4 adjusting communication between the dynamic pressure source 5 and the reservoir 6 and the dynamic pressure chamber 7 in response to a command from an electronic control device 3 to control output hydraulic pressure, wherein the hydraulic pressure in the drive hydraulic pressure chamber is adjusted by the hydraulic pressure in both high and low pressure sources.

DOCUMENT LIST OF STATE OF ART

Patent Document

Patent Document 1: JP02(1990)-299962 A

DISCLOSURE OF INVENTION

Problems to be Solved

However, according to the brake device disclosed in the above Patent Document 1, in case of failure of electric system, the electric pump in the dynamic pressure source 5 and the modulating valve 4 become in a non-operable condition, not to be able to supply the drive hydraulic pressure chamber with a predetermined pressure. This may lead to drop of the braking force.

The present invention was made in consideration with the above problems and the object of the invention is to provide a brake device which can prevent the reduction of braking force by supplying a predetermined pressure to a drive hydraulic pressure chamber even in case of failure of electric system.

Means for Solving the Problem

A first aspect of the invention is characterized in that a brake device comprises a drive hydraulic pressure chamber for driving a master piston, a high pressure source accumulating the hydraulic pressure of brake fluid pumped from an electric pump, a low pressure source reserving a pressure lower than the pressure accumulated in the high pressure source, a pressure increase control valve provided in a passage connecting the high pressure source and the drive hydraulic pressure chamber and controlling a brake fluid flow from the high pressure source to the drive hydraulic pressure chamber and a pressure decrease control valve provided in a passage connecting the low pressure source and the drive hydraulic pressure chamber and controlling a brake fluid flow from the drive hydraulic pressure chamber to the low pressure source, thereby to control the hydraulic pressure of the drive hydraulic pressure chamber by controlling the pressure increase control valve and the pressure decrease control valve, wherein the brake device further comprises a mechanical type pilot pressure generating portion generating a pilot hydraulic pressure in response to an operating amount of a brake operating member, a mechanical pressure modulating portion having a high pressure port connected to the high pressure source, a low pressure port connected to the low pressure source, a pilot pressure input port connected to the mechanical type pilot pressure generating portion and an output port connected to the drive hydraulic pressure chamber, wherein a hydraulic pressure is outputted from the output port in response to the pressure applied to the pilot pressure input port by the hydraulic pressure applied to both high pressure and the low pressure ports, a first passage connecting the high pressure source and the high pressure port, a second passage connecting the low pressure source and the low pressure port, a third passage for connecting the mechanical pilot pressure generating portion and the pilot pressure input port, a fourth passage for connecting the drive hydraulic pressure chamber and the output port and a fifth passage provided as the passage for connecting the high pressure source and the drive hydraulic pressure chamber and connecting the high pressure source and the drive hydraulic pressure chamber by bypassing the high pressure port of the pressure modulating portion, wherein the passage connecting the low pressure source and the drive hydraulic pressure chamber is formed to comprise the second passage and the fourth passage, the pressure decrease control valve is formed to be a normally open type control valve provided in the second passage or in the fourth passage, the pressure increase control valve is formed to be a normally closed type control valve provided in the fifth passage and wherein the fluid communications of the first through fourth passages are established when the pressure increase control valve and the pressure decrease control valve are in de-energized condition.

According to a second aspect of the invention, the brake device further includes a normally open type pilot pressure control valve provided in the third passage and controlling the brake fluid flow between the mechanical type pilot pressure generating portion and the pilot pressure input port, a vehicle condition detecting means for detecting a predetermined vehicle condition and a control means for controlling the pilot pressure control valve in response to a detected result of the vehicle condition detected by the vehicle condition detecting means.

A third aspect of the invention is characterized in that in the brake device the vehicle condition detecting means detects that a regeneration is required and the control means closes the pilot pressure control valve when the vehicle condition detecting means detects that the regeneration has been required.

A fourth aspect of the invention is characterized in that in the brake device, the vehicle condition detecting means detects that an anti-lock brake controlling is being performed and the control means opens the pilot pressure control valve when the vehicle condition detecting means detects that the anti-lock brake controlling is being performed.

A fifth aspect of the invention is characterized in that in the brake device, the pressure decrease control valve is provided in the second passage.

A sixth aspect of the invention is characterized in that in the brake device, the mechanical type pilot pressure generating portion is formed to have a piston movable in cooperation with the brake operating member and a cylinder in which the piston is slidably movable, wherein a hydraulic pressure in a hydraulic pressure chamber, to which a stroke simulator is connected, formed by the piston and the cylinder is generated as a pilot hydraulic pressure.

A seventh aspect of the invention is characterized in that in the brake device, the mechanical type pilot pressure generating portion is formed to have the master piston and a master cylinder in which the piston is slidably movable, wherein a hydraulic pressure in a master chamber formed by the master piston and the master cylinder is generated as a pilot hydraulic pressure.

The Effects of the Invention

According to the brake device according to the first aspect of the invention, when the pressure increase control valve and the pressure decrease control valve are in de-energized condition due to a failure of electric system, the communications of first through fourth passages are established. The passage connecting the low pressure source and the drive hydraulic pressure chamber is formed to include the second and the fourth passages. Since the pressure decrease control valve is a normally open type control valve, even when the valve becomes in de-energized condition, the passage connecting the low pressure source and the drive hydraulic pressure chamber is not closed by the pressure decrease control valve.

Accordingly, in the mechanical type pressure modulating portion, the high pressure port, the low pressure port, the pilot pressure input port and the output port are respectively connected to the high pressure source, the low pressure source, the mechanical type pilot pressure generating portion and the drive hydraulic pressure chamber and the hydraulic pressure in response to the operating amount of the brake operating member is outputted from the output port. As the result, the hydraulic pressure in the drive hydraulic pressure chamber becomes a pressure level corresponding to the operating amount of the brake operating member and the master piston is operated by the hydraulic pressure in response to the operating amount of the brake operating member.

Thus, if a failure in the electric system occurs, in other words, if the hydraulic pressure in the drive hydraulic pressure chamber cannot be modulated by the control of the pressure increase control valve and the pressure decrease control valve and the brake fluid cannot be pumped to the high pressure source by the electric pump, the braking force corresponding to the operating amount of the brake operating member can be generated as long as the hydraulic pressure remains in the high pressure source.

Further, the fifth passage is a passage which connects the high pressure source and the drive hydraulic pressure chamber by bypassing the high pressure port of the pressure modulating portion. Since the pressure increase valve is a normally closed type valve, if the failure in the electric system occurs, the flow of the brake fluid from the high pressure source to the drive hydraulic pressure chamber is interrupted by the pressure increase valve.

Thus, the consumption of fluid in the high pressure source can be minimized upon electric system failure and the generation of braking force upon such electric system failure can be maintained for a relatively longer time (compared to the case that a normally open type control valve is used for the pressure increase control valve).

On the other hand, when no electric system failure occurs and accordingly, the electric pump, the pressure increase control valve and the pressure decrease control valve are in normally operated, the mechanical type pressure modulating portion is operated in addition to the control operation of the pressure increase control valve and the pressure decrease control valve.

According to the second aspect of the invention, the control means controls the pilot pressure control valve which controls the brake fluid flow between the mechanical type pilot pressure generating portion and the pilot pressure input port in response to the vehicle condition when no electric system failure occurs. Accordingly, the pressure control can be properly performed by the mechanical type pressure modulating portion in response to the vehicle condition.

It is noted here that the vehicle condition includes ignition switch ON/OFF condition and the control of the pilot pressure control valve based on the vehicle condition detected result includes the control of the pilot pressure control valve to be always closed during no electric system failure occurrence, when the ignition switch is in ON condition.

According to the third aspect of the invention, when no electric system failure occurs and regeneration is required, the pilot pressure control valve is closed and accordingly, no output hydraulic pressure of the mechanical type pilot pressure generating portion is supplied to the pilot pressure input port of the pressure modulating portion in response to the operating amount of the brake operating member. Therefore, no pressure modulating operation by the mechanical pressure modulating portion is performed. Accordingly, the hydraulic pressure in response to the requirement of the regeneration can be supplied to the drive hydraulic pressure chamber by controlling the pressure increase control valve and the pressure decrease control valve thereby to achieve braking operation based on a desired regenerative braking force.

According to the fourth aspect of the invention, when no electric system failure occurs and an anti-lock brake controlling is being performed, the pilot pressure control valve is opened. Accordingly, the hydraulic pressure modulated by the mechanical type pressure modulating portion and the hydraulic pressure controlled by both pressure increase and pressure decrease control valves are supplied to the brake system and braking operation can be sufficiently performed even if a large amount of brake fluid is needed for performing the anti-lock brake controlling operation.

According to the fifth aspect of the invention, the pressure decrease control valve is provided in the second passage where the flow rate of the brake fluid is smaller than that in the fourth passage, instead of providing the pressure decrease control valve in the fourth passage where the flow rate of the brake fluid is larger than that in the fourth passage so that the flow rate of the brake fluid between the drive hydraulic pressure chamber and the pressure modulating portion may not be restricted by the maximum allowable flow rate of the pressure decrease control valve.

According to the sixth aspect of the invention, the mechanical type pilot pressure generating portion is formed to have the piston movable in cooperation with the brake operating member and the cylinder in which the piston is slidably movable, wherein the hydraulic pressure in the hydraulic pressure chamber, to which the stroke simulator is connected, formed by the piston and the cylinder, is generated as a pilot hydraulic pressure. According to this structure, the pilot hydraulic pressure in response to the operating amount of the brake operating member can be properly generated with a simple structure.

According to the seventh aspect of the invention, the mechanical type pilot pressure generating portion is formed to have the master piston and the master cylinder in which the piston is slidably movable, wherein the hydraulic pressure in the master chamber formed by the master piston and the master cylinder is generated as a pilot hydraulic pressure. Thus, without providing a particular structure for generating a pilot hydraulic pressure, an existing master cylinder structure can be utilized to achieve downsizing and cost reduction of the device.

BRIEF EXPLANATION OF ATTACHED DRAWINGS

THE EMBODIMENTS FOR IMPLEMENTING THE INVENTION

1) First Embodiment

Figure 1:
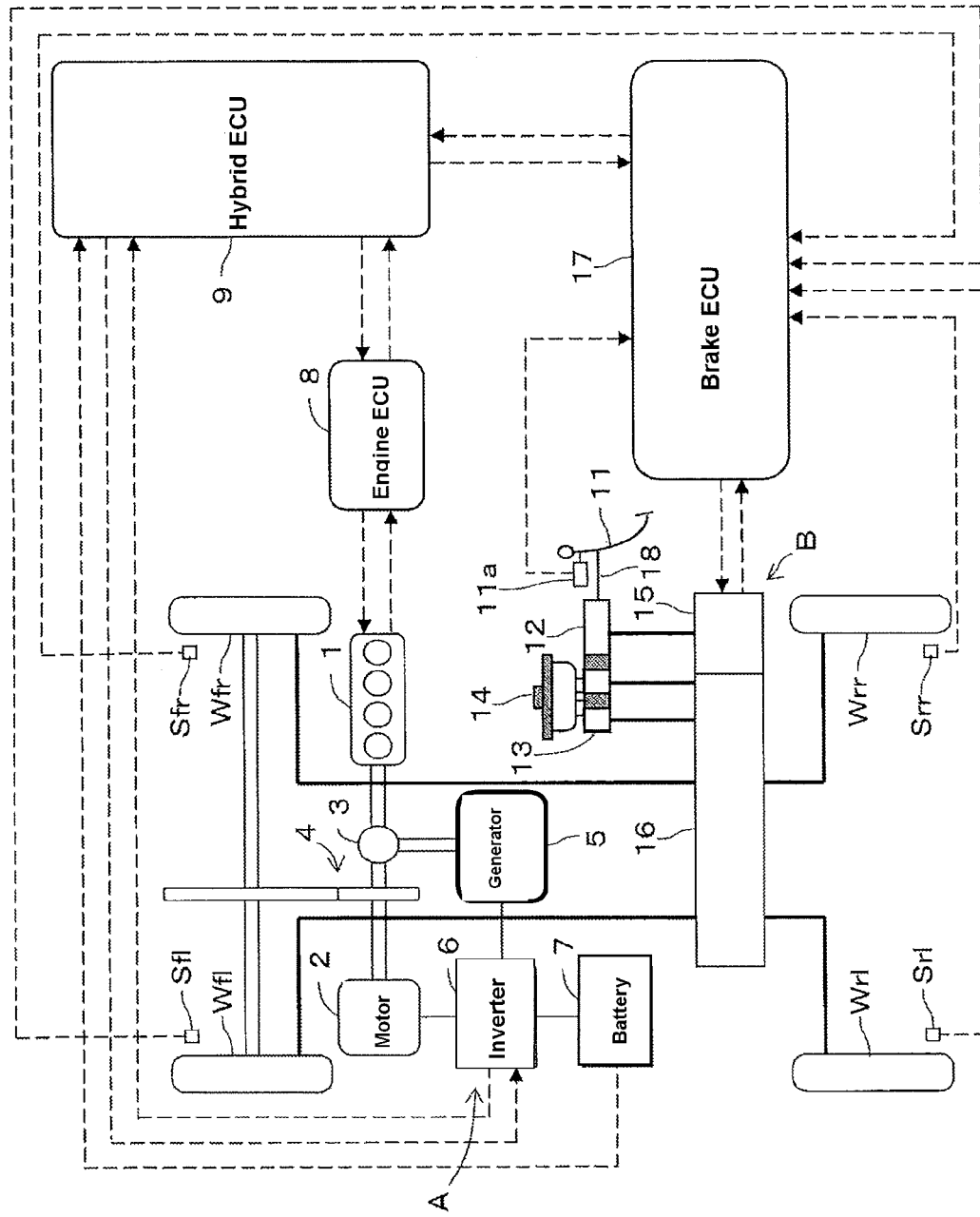
FIG. 1 is a block view showing a brake device according to the invention.
Figure 2:
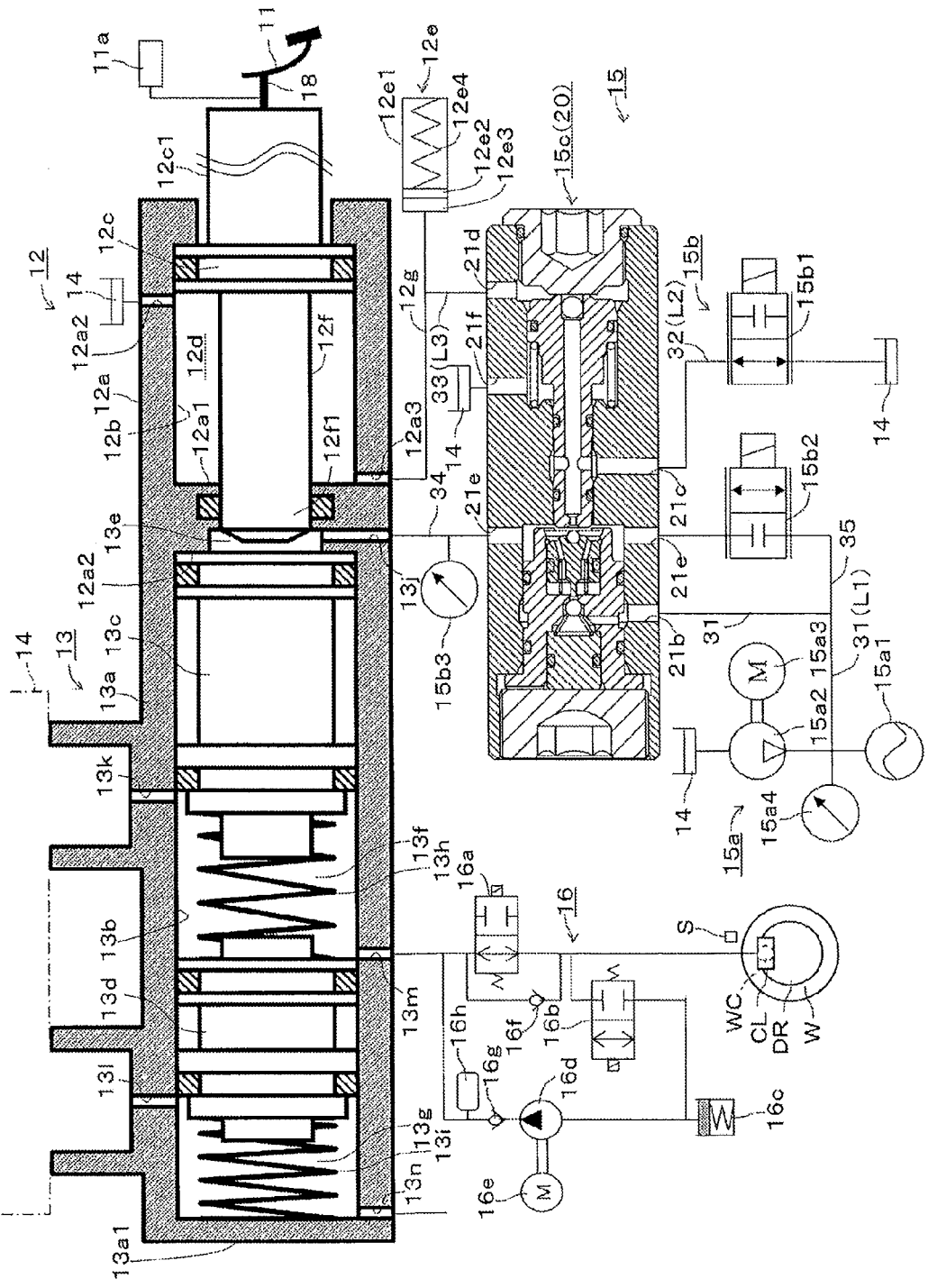
FIG. 2 shows an outline view of the brake device shown in FIG. 1.
Figure 3:
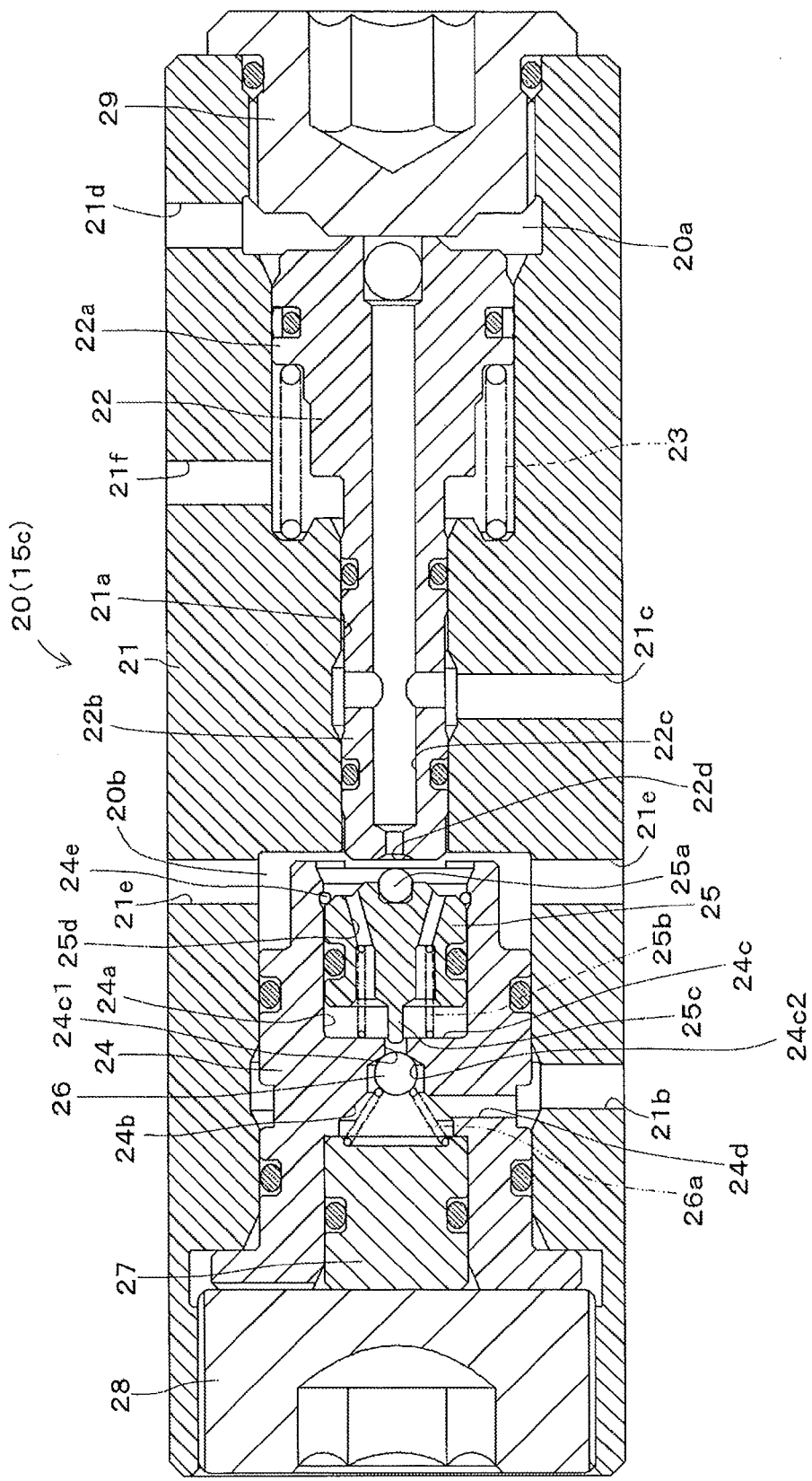
FIG. 3 is a cross sectional view of the regulator in FIG. 2 showing that no pilot pressure is applied thereto.
Figure 4:
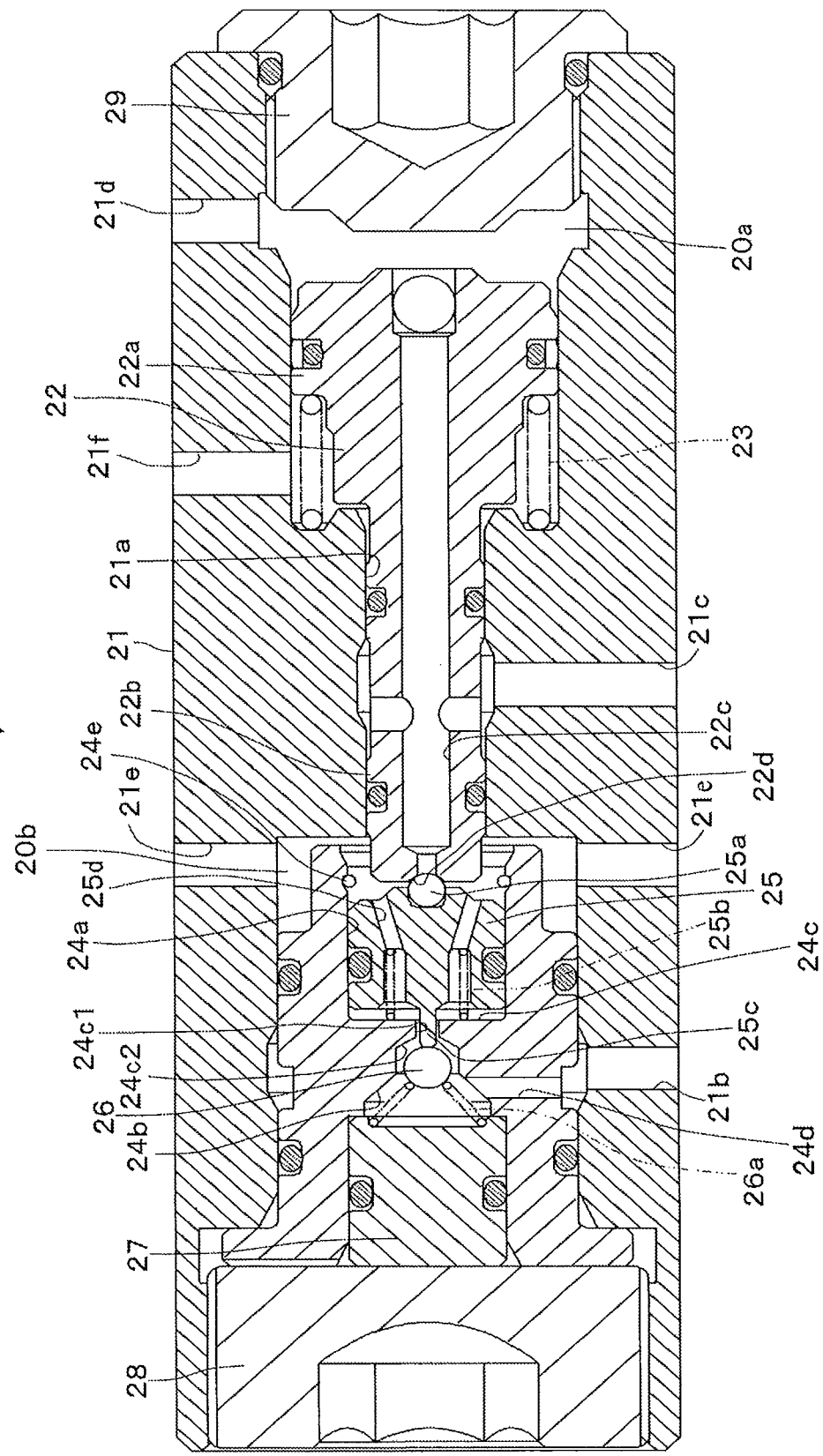
FIG. 4 is a cross sectional view of the regulator showing that the pilot pressure is applied thereto.

The brake device associated with the present invention adapted to a hybrid vehicle according to a first embodiment will be explained with reference to the attached drawings. FIG. 1 shows an outline view of the structure of the hybrid vehicle and FIG. 2 shows an outline view of the brake device. FIGS. 3 and 4 show the regulator which corresponds to the mechanical type pressure modulating portion.

The hybrid vehicle as shown in FIG. 1 shows a vehicle that drives the driving wheels such as for example, left front and right front wheels Wfl and Wfr by the hybrid system. The hybrid system includes a power train using in combining two kind of power sources, engine 1 and motor 2. According to this first embodiment, the hybrid system is formed to be a parallel hybrid system in which the vehicle wheels are directly driven by both engine 1 and motor 2. As a different type hybrid system, a serial hybrid system has been developed, in which the motor 2 drives the vehicle wheels and the engine 1 functions as an electricity supply source for supplying the motor 2 with electricity.

The hybrid vehicle with the parallel hybrid system includes the engine 1 and the motor 2. The driving force of the engine 1 is transmitted to the driving wheels (in this first embodiment, left front and right front wheels Wfl and Wfr) via a power split mechanism 3 and a power transmitting mechanism 4 and the driving force of the motor 2 is transmitted to the driving wheels via the power transmitting mechanism 4. The power split mechanism 3 properly divides the driving force of the engine 1 into a vehicle driving force and an electric generator driving force. The power transmitting mechanism 4 transmits to the driving wheels the driving forces of the engine 1 and the motor 2 by properly integrating the two in response to the running condition of the vehicle. The power transmitting mechanism 4 adjusts the driving ratio of the driving force of the engine 1 and the motor 2 to be between 0:100 and 100:0. This power transmitting mechanism 4 includes the speed change function.

The motor 2 assists the output of the engine 1 to improve the driving force and on the other hand, the motor generates electricity upon vehicle braking operation and charges the batteries 7. An electric generator 5 generates electricity by the output of the engine 1 and has the function of starter for start-up of engine. The motor 2 and the electric generator 5 are electrically connected to an inverter 6, respectively. The inverter 6 is electrically connected to the batteries 7 as the DC electric power source and serves to supply the batteries 7 with the AC voltages inputted from the motor 2 and the electric generator 5 by converting into the DC voltages or vice versa, serves to output the DC voltages from the batteries 7 to the motor 2 and the electric generator 5 by converting into the AC voltages.

According to the first embodiment, a regeneration brake device A is formed by the motor 2, inverter 6 and batteries 7. This regeneration brake device A generates the regenerative braking force at any of (in this first embodiment, vehicle wheels Wfl and Wfr driven by the motor 2 as the driving power source) the vehicle wheels Wfl, Wfr, Wfl and Wrr based on the brake operation condition detected by a pedal stroke sensor 11a (or a pressure sensor P).

The engine 1 is controlled by an engine ECU 8 (Electronic Control Unit) and the engine ECU 8 controls to adjust the rotation speed of the engine 1 by outputting opening degree instructions to an electronic control throttle valve in response to an engine output requirement value from a later explained hybrid ECU (electronic Control Unit) 9. The hybrid ECU 9 is connected to the inverter 6 for mutual communication. Necessary engine output, electric motor torque and electric generator torque are introduced from the throttle opening degree and shift position (calculated by the shift position signal inputted from a not shown shift position sensor) and inputted to the hybrid ECU 9. The hybrid ECU 9 then outputs the engine output requirement value to the engine ECU 8 to control the driving force of the engine 1 and controls the motor 2 and the electric generator 5 through the inverter 6 according to the inputted electric motor torque requirement value and the electric generator torque requirement value. Further, the hybrid ECU 9 is connected to the batteries 7 to watch the battery charge condition and the charge current and also is connected to a throttle opening degree sensor (not shown) to be installed in an acceleration pedal (not shown) for detecting a vehicle throttle opening degree. The hybrid ECU 9 inputs the throttle opening degree signal from the throttle opening degree sensor.

Further, a brake ECU 17 is connected to the hybrid ECU 9 to be mutual communication and performs a cooperative control between the regenerative braking operation by the motor 2 and the hydraulic braking operation so that the total braking force of the vehicle becomes equal to the hydraulic braking force only. In more detail, the brake ECU 17 outputs the regeneration braking required value which is to be generated by the regeneration braking device among the total braking force to the hybrid ECU 9 as the target value of the regeneration braking device, i.e., the target regenerative braking force when an operator of the vehicle requires braking operation, i.e., under the braking operation condition. The hybrid ECU 9 then calculates the actual regeneration braking operation value for actually performing the regeneration braking based on the inputted regeneration braking required value (target regeneration braking force) considering the vehicle speed and battery charge condition, etc., and controls the motor 2 through the inverter 6 to generate the regeneration braking force corresponding to the actual regeneration braking operation value and at the same time outputs the calculated actual regeneration braking operation value to the brake ECU 17.

Further, the brake ECU 17 memorizes in advance the hydraulic braking force to be applied to the wheel W when the brake hydraulic pressure is supplied to the wheel brake cylinders WC in a memory in the form of map, table or the calculation formula. Further, the brake ECU 17 also memorizes in advance the target regeneration braking force to be applied to the wheel W in response to the brake operating condition which corresponds to the brake pedal stroke (or the master cylinder pressure) in a memory in the form of map, table or the calculation formula.

The hybrid vehicle is also equipped with a hydraulic brake device B for braking or stopping the vehicle by applying hydraulic braking force to each vehicle wheel Wfl, Wfr, Wrl and Wrr directly. The hydraulic brake device B, as shown in FIG. 2, includes a brake pedal 11 which corresponds to the brake operating member, a stroke simulator portion 12, master cylinder 13, reservoir tank 14, master piston drive hydraulic pressure modulating device 15 (hereinafter referred to as drive hydraulic pressure modulating device 15), braking force hydraulic pressure modulating device 16, brake ECU 17 and wheel cylinders WC.

The wheel cylinder WC is disposed in the caliper CL and restricts the rotation of each wheel W. When the pressurized brake fluid (brake hydraulic pressure) is supplied to the wheel cylinder WC from the master cylinder 13, the piston (not shown) in each wheel cylinder WC pushes a pair of brake pads (not shown) which is made from a friction material to squeeze the disc rotor DR which is a rotation member rotating with the wheel W from both sides thereof to stop the rotation of the disc rotor. It is noted here that according to this embodiment, only one hydraulic conduit system is shown among the left/right front/rear wheels and the other similarly structured hydraulic conduit brake systems are omitted and further it is noted that according to this embodiment, the disc brake is adapted, but the drum type brake may be adapted either. The wheel W represents either one of the left/right front/rear wheels Wfl, Wfr, Wrl and Wrr.

In the vicinity of the brake pedal 11, a pedal stroke sensor 11a is provided for detecting the brake pedal stroke which corresponds to the brake operating condition by brake pedal 11 depressions. This pedal stroke sensor 11a is connected to the brake ECU 17 to output a detection signal to the brake ECU 17.

The brake pedal 11 is connected to the stroke simulator portion 12 through a push rod 18. The stroke simulator portion 12 includes a body 12a, a bore 12b provided on the body 12a, a piston 12c in liquid-tightly slidable within the bore 12b, a hydraulic pressure chamber 12d formed between the body 12a and the piston 12c and a stroke simulator 12e in fluid communication with the hydraulic pressure chamber 12d.

The body 12a is integrally connected with the body 13a of the master cylinder 13. One end side in a sliding direction (axial direction) of the piston 12c is formed with a connecting portion 12c1 to which the push rod 18 is connected. Rod 12f is integrally formed at the other end side opposite to the push rod 18 in a sliding direction of the piston 12c. The other end side portion 12f1 of the rod 12f opposite to the piston 12c penetrates through a partition wall 12a1 which separates the hydraulic pressure chamber 12d of the stroke simulator portion 12 from the drive hydraulic pressure chamber 13e of the master cylinder 13 and liquid-tightly supported thereby. The partition wall 12a1 is formed to be a part of the body 12a.

The hydraulic pressure chamber 12d is in communication with the reservoir tank 14 through the first input/output port 12a2 and is also in communication with the stroke simulator 12e through the fluid passage 12g connected to the second input/output port 12a3. The stroke simulator 12e is of a well known type which generates a magnitude of stroke to the brake pedal 11 corresponding to the operating condition of the brake pedal 11. The stroke simulator 12e includes a piston 12e2 which liquid-tightly slides in the housing 12e1, a hydraulic pressure chamber 12e3 formed between the housing 12e1 and the piston 12e2 and a spring 12e 4 biasing the piston 12e2 in a direction where the volume of the hydraulic pressure chamber 12e3 is decreased.

The master cylinder 13 is a device which establishes a hydraulic pressure (master cylinder pressure) in response to the operation force of the brake pedal 11 which corresponds to the brake operating member by the operator of the vehicle and supplies the wheel cylinders with the hydraulic pressure thereby to generate hydraulic braking force at the wheel W by the supplied hydraulic pressure.

The master cylinder 13 is of tandem type which includes the body 13a and the body 13a is provided with a cylinder bore 13b in which the first and the seconds pistons 13c and 13d are slidably movably inserted.

The drive hydraulic pressure chamber 13e is formed between the first piston 13c and the partition wall 12a1 for driving the first and the second pistons 13c and 13d. The other end side portion 12f1 of the rod 12f exposing to the drive hydraulic pressure chamber 13e and is arranged reciprocally therein. The partition wall 12a1 is provided with a stepped portion 12a2 with which one end of the first piston 13c engages. The volume of the drive hydraulic pressure chamber 13e is assured even when the first piston 13c engages with the stepped portion 12a2.

A first hydraulic pressure chamber 13f establishing the master cylinder pressure is formed between the first and the second pistons 13c and 13d and a second hydraulic pressure chamber 13g establishing the master cylinder pressure is formed between the second pistons 13d and the bottom wall 13a1. A biasing member 13h (for example, a spring) is disposed within the first hydraulic pressure chamber 13f between the first and the second pistons 13c and 13d and biasing the piston in a direction to expand the volume of the first hydraulic pressure chamber 13f. A biasing member 13i (for example, a spring) is disposed within the second hydraulic pressure chamber 13f g between the second pistons 13d and the bottom wall 13a1 and biasing the piston in a direction to expand the volume of the second hydraulic pressure chamber 13g.

When no hydraulic pressure is established in the drive hydraulic pressure chamber 13e (for example, when the brake pedal is not depressed). The second piston 13d is in a predetermined position by being biased by the biasing member 13h and the first piston 13c is in a predetermined position by being biased by the biasing member 13i (See FIG. 2). The predetermined position of the first piston 13c is set and fixed by contact of the one end of the first piston 13c with the stepped portion 12a2. This fixed position is a position immediately before the other end of the first piston 13c closes the port 13k. The predetermined position of the second piston 13d is set and fixed to a position immediately before the other end of the second piston 13d closes the port 13l.

The body 13a of the master cylinder 13 is provided with a port 13j for establishing fluid communication between the drive hydraulic pressure chamber 13e and the regulator 15c, a port 13k for establishing fluid communication between the first hydraulic pressure chamber 13f and the reservoir tank 14, a port 13l for establishing fluid communication between the second hydraulic pressure chamber 13g and the reservoir tank 14, a port 13m for establishing fluid communication between the first hydraulic pressure chamber 13f and the wheel cylinder WC and a port 13n for fluid communication between the second hydraulic pressure chamber 13g and the other wheel cylinders (not shown).

The drive hydraulic pressure modulating chamber 15 controls the pressure in the drive hydraulic pressure chamber 13e of the master cylinder 13 by the hydraulic pressure of the high pressure source and the low pressure source and is provided with a pressure supply device 15a, an electric pressure modulating portion 15b and a regulator 15c. The drive hydraulic pressure modulating chamber 15 establishes a regulator pressure in response to the operating amount of the brake pedal 11 by either one of the electric pressure modulating portion 15b and the regulator 15c which receives the pressure from the pressure supply device 15a and supplies the drive hydraulic pressure chamber 13e of the master cylinder 13 with the established regulator pressure.

The pressure supply device 15a includes the reservoir tank 14 as the low pressure source, an accumulator 15a1 as the high pressure source, a pump 15a2 which suctions the brake fluid from the reservoir tank 14 and pumps the fluid to the accumulator 15a1 and an electric motor 15a3 which drives the pump 15a2.

The reservoir tank 14 (low pressure source) is connected to the drive hydraulic pressure chamber 13e of the master cylinder 13. The pressure in the low pressure source is lower than the pressure in the high pressure source. Further, the accumulator 15a1 is connected to the drive hydraulic pressure chamber 13e of the master cylinder 13.

The reservoir tank 14 is commonly used as a low pressure source for the pressure supply device 15a. However, a separate reservoir tank may be used instead of common use. The pressure supply device 15a is provided with a pressure sensor 15a 4 which detects the pressure of the brake fluid supplied from the accumulator 15a1 and outputs to the brake ECU 17.

The electric type pressure modulating portion 15b includes a normally open type pressure decrease control valve 15b1 which controls the flow of brake fluid between the reservoir tank 14 and the drive hydraulic pressure chamber 13e, a normally closed type pressure increase control valve 15b2 which controls the flow of brake fluid between the accumulator 15a1 and the drive hydraulic pressure chamber 13e and a pressure sensor 15b3 for detecting the hydraulic pressure in the drive hydraulic pressure chamber 13e. The pressure decrease control valve 15b1 and the pressure increase control valve 15b2 are the solenoid valve which is operated in response to the command from the brake ECU 17. The pressure sensor 15b3 outputs the detection signal to the brake ECU 17.

The electric type pressure modulating portion 15b supplies hydraulic pressure to the drive hydraulic pressure chamber 13e in response to the stroke amount of the brake pedal 11 detected by the pedal stroke sensor 11a and the vehicle condition by controlling the hydraulic pressure supplied to the drive hydraulic pressure chamber 13e from the accumulator 15a1 by the pressure increase control valve 15b1 monitoring the detected pressure value by the pressure sensor 15b3 and by controlling the discharge of the brake fluid to the reservoir tank 14 (discharged hydraulic pressure to the reservoir tank 14 from the drive hydraulic pressure chamber 13e) by controlling the pressure decrease control valve 15b2.

The regulator 15c is formed by the regulator 20 as shown in FIG. 3. The housing 21 of the regulator 20 is provided with a cylinder bore 21a and at the same time is provided with high pressure port 21b, low pressure port 21c, pilot pressure input port 21d, output port 21e and a drain port 21f. As shown in FIG. 2, the high pressure port 21b is directly connected to the accumulator 15a1 through a hydraulic passage 31. The low pressure port 21c is connected to the reservoir tank 14 through the hydraulic passage 32. The pilot pressure input port 21d is connected to the hydraulic pressure chamber 12d of the stroke simulator portion 12 via the hydraulic passage 33 which is connected to the fluid passage 12g. The output port 21e is connected to the drive hydraulic pressure chamber 13e of the master cylinder 13 via the hydraulic passage 34. The drain port 21f is connected to the reservoir tank 14. The hydraulic passage 31 is connected to the output port 21e via the hydraulic passage 35 which is branched from the passage 31 on the way.

It is noted here that the "directly connected" means that there is no electromagnetic valve or check valve provided in the hydraulic passage. According to the embodiment, the first passage L1 which connects the accumulator 15a1 as the high pressure source and the high pressure port 21b is formed by the hydraulic passage 31. The second passage L2 which connects the reservoir tank 14 as the low pressure source and the low pressure port 21c is formed by the hydraulic passage 32. The third passage L3 which connects the stroke simulator portion 12 as the mechanical type pilot pressure generating portion and the pilot pressure input port 21d is formed by the hydraulic passage 33. The fourth passage L4 which connects the drive hydraulic pressure chamber 13e and the output port 21e is formed by the hydraulic passage 34.

The fifth passage L5 is formed by the hydraulic passage 31 (passage portion between the accumulator 15a1 and the connection point of the hydraulic passage 35), hydraulic passage 35, output port 21e, pressure modulating chamber 20b, output port 21e, hydraulic passage 34 and the port 13j. The fifth passage L5 connects the accumulator 15a1 and the drive hydraulic pressure chamber 13e bypassing the high pressure port 21b via the output port 21e. The pressure increase control valve 15b2 is disposed in the hydraulic passage 35 and the pressure decrease control valve 15b1 is disposed in the hydraulic passage 32.

A pressure modulating piston 22 is liquid-tightly and slidably disposed in the cylinder bore 21a. The pressure modulating piston has a large diameter portion 22a and a small diameter portion 22b, the diameter of which is smaller than that of the large diameter portion 22a. Both portions 22a and 22b are formed integrally. Each end surface area of the large diameter portion 22a side and the small diameter portion 22b side is set so that the regulator 20c can output the hydraulic pressure from the output port 21e in response to the pressure applied to the pilot pressure input port by the hydraulic pressure applied to both ports of the high and the low pressure ports.

The pilot hydraulic pressure chamber 20a is formed between the one end side (right as viewed in the Figure) of the large diameter portion 22a of the pressure modulating piston 22 and the nut 29 which closes the right end opening of the cylinder bore 21a. The pressure modulating chamber 20b is formed at the small diameter portion 22b side (left side as viewed in the Figure) of the pressure modulating piston 22. The pilot hydraulic pressure chamber 20a is in fluid communication with the pilot pressure input port 21d and the pressure modulating chamber 20b is in fluid communication with the output port 21e (two ports are formed according to this embodiment). A communication passage 22c which communicates with the low pressure port 21c is provided at the pressure modulating piston 22. A spring 23 is disposed in the pressure modulating chamber 20b and the spring 23 biases the pressure modulating piston 22 in a direction to increase the volume of the pressure modulating chamber 20b.

When no hydraulic pressure is applied to the pilot hydraulic pressure chamber 20a (for example, when the brake pedal is not operated). The pressure modulating piston 22 is biased in the right direction as viewed in the drawing by the biasing force of spring 23 and the right end of the piston 22 is in contact with the nut 29 thereby to fix the position. At this time, since a pressure decrease valve (later explained) is in open state, the output port 21e communicates with the low pressure port 21c via the pressure modulating chamber 20b and the communication passage 22c.

The cylinder member 24 is fixed to the left end side of the cylinder bore 21a as viewed in the drawing and the cylinder member 24 includes a separation portion 24c for defining two bores 24a and 24b. The bore 24a is positioned to oppose the pressure modulating chamber 20b and a valve body 25 is slidably disposed in the bore 24a. A ball 25a is fixed to the pressure modulating chamber 20b side of the valve body 25 and this ball 25a is detachably engaged with the valve seat 22d which is formed at the pressure modulating chamber 20b side end of the piston 22. The ball 25a is seated on the valve seat 22d when the pressure modulating piston 22 slides in a direction to reduce the volume of the pressure modulating chamber 20b by a predetermined distance. The pressure decrease valve is formed by the ball 25a and the valve seat 22d for reducing the hydraulic pressure (regulator hydraulic pressure) in the pressure modulating chamber 20b by establishing or interrupting the communication between the pressure modulating chamber 20b and the communication passage 22c. The valve body 25 is biased towards the valve seat 22d side by the spring 25b. A small diameter projection 25c is integrally formed on the opposite side end of the valve body 25. Further, the valve body 25 is provided with a communication passage 25d which establishes communication between a space formed by the bore 24a, the separation portion 24c and the valve body 25 and the pressure modulating chamber 20b.

The bore 24b of the cylinder member 24 is freely movably provided with a ball shaped valve body 26 and is detachable with the valve seat 24c2 of the valve bore 24c1 formed at the separation portion 24c. The valve bore 24c1 has an inner diameter set to be larger than the outer diameter of the projection 25c so that the projection 25c of the valve body 25 can advance into or retreat from the valve bore 24c1. The valve body 26 is biased by the spring 26a towards the valve seat 24c2 side and normally seated on the valve seat 24c2. When the valve body 25 slides in a left direction as viewed in the drawing, the valve body 26 is separated from the valve seat 24c2 by being pushed by the projection 25c of the valve body 25. A communication passage 24d is formed on the cylinder member 24 for communication between the bore 24b and the high pressure port 21b. The pressure increase valve is formed by the valve body 26, valve seat 24c2 and spring 26 and the pressure increase valve establishes or interrupts the fluid communication between the pressure modulating chamber 20b and the communication passage 24d in cooperation with the pressure decrease valve thereby to increase the hydraulic pressure (regulator hydraulic pressure) in the pressure modulating chamber 20b. The bore 24b is closed by the plug body 27 and the cylinder member 24 is fixed by the nut 28.

The operation of thus structured regulator 20 will be explained with reference to FIGS. 3 and 4. When the pressure in the pilot hydraulic pressure chamber 20a is increased until the force (=Pressure×Area) operating on the large diameter portion 22a of the pressure modulating piston 22 becomes greater than the total force of the force operating on the small diameter portion 22b side and the biasing force of the spring 23, then the pressure modulating piston 22 starts to move in a left direction. By further leftward movement of the pressure modulating piston 22, the valve seat 22d contacts with the ball 25a and the pressure decrease valve becomes in a closed condition. Further, the pressure modulating piston 22 moves in a left direction, the valve body 25 is moved in the left direction overcoming the biasing force of spring 25b. By further movement of the valve body 25, the projection 25c contacts with the valve body 26 and thereafter the valve body 26 moves to the left overcoming the biasing force of spring 26a to have the pressure increase valve in an open condition. (See FIG. 4).

When the pressure increase valve is opened, the high pressure hydraulic fluid is supplied to the pressure modulating chamber 20b through high pressure port 21b, communication passage 24d, valve bore 24c1 and communication passage 25d. When the hydraulic pressure in the pressure modulating chamber 20b is increased until the force (=Pressure×Area) operating on the large diameter portion 22a side of the pressure modulating piston 22 becomes smaller than the total force of the force operating on the small diameter portion 22b side and the biasing force of the spring 23, then the pressure modulating piston 22 starts to move to the right. After the pressure increase valve is closed and the valve body 25 contacts with the restriction member 24e, the pressure decrease valve becomes in open condition. Then, the hydraulic pressure in the pressure modulating chamber 20b is decreased due to the fluid communication with the low pressure port 21c via the communication passage 21c.

Then when the hydraulic pressure in the pressure modulating chamber 20b drops until the force (=Pressure×Area) operating on the large diameter portion 22a side of the pressure modulating piston 22 becomes greater than the total force of the force operating on the small diameter portion 22b side and the biasing force of the spring 23, then the pressure modulating piston 22 starts to move in the right direction again. By this repetitive reciprocating movement of the pressure modulating piston 22 in right/left direction, the regulator 20 can output the hydraulic pressure from the output port 21e corresponding to the hydraulic pressure to be supplied to the pilot hydraulic pressure chamber 20a by the pressure applied to both high pressure and low pressure ports 21b and 21c.

As explained above, the reservoir tank 14 which corresponds to the low pressure source and the drive hydraulic pressure chamber 13e of the master cylinder 13 are connected by the fluid passage (the passage connecting the low pressure source and the drive hydraulic pressure chamber as recited in claims) formed by the hydraulic passage 32, the low pressure port 21c, the communication passage 22c, the pressure modulating chamber 20b, the output port 21e, the hydraulic passage 34 and the port 13j. In this passage the pressure decrease control valve 15b1 is disposed.

Further, the accumulator 15a1 which corresponds to the high pressure source and the drive hydraulic pressure chamber 13e of the master cylinder 13 are connected by the fluid passage (the passage connecting the high pressure source and the drive hydraulic pressure chamber as recited in claims) formed by the hydraulic passage 31 (the passage portion between the accumulator 15a1 and the connecting point of the hydraulic passage 35), the hydraulic passage 35, the pressure modulating chamber 20b, the output port 21e, the hydraulic passage 34 and the port 13j. In this passage the pressure increase control valve 15b2 is disposed.

Further, when the pressure increase control valve 15b2 and the pressure decrease control valve 15b1 are in de-energized condition, the accumulator 15a1 and the drive hydraulic pressure chamber 13e are connected by the fluid passage formed by the hydraulic passage 31, the high pressure port 21b, the communication passage 24d, valve bore 24c1, communication passage 25d, the pressure modulating chamber 20b, the output port 21e, the hydraulic passage 34 and the port 13j. As explained above the fluid passage can connect the accumulator 15a1 and the drive hydraulic pressure chamber 13e intermittently under the regulator 15c being operated. This fluid passage is a passage connecting the accumulator 15a1 and the drive hydraulic pressure chamber 13e via the high pressure port 21b and the output port 21e.

The brake hydraulic pressure adjusting device 16 as shown in FIG. 2 includes a holding valve 16a, pressure decrease valve 16b, reservoir tank 16c, pump 16d and electric motor 16e. The holding valve 16a is disposed between the port 13m of the master cylinder 13 and the wheel cylinder WC and is a normally open type electromagnetic switching valve for establishing or interrupting fluid communication between the master cylinder 13 and the wheel cylinder WC. The holding valve 16a becomes in open condition (condition shown in FIG. 2) when de-energized upon receipt of command from the brake ECU 17 and becomes in closed condition when energized. Thus the holding valve 16a is structured to be a two-positioned valve. A check valve 16f is provided in parallel with the holding valve 16a for allowing the fluid flow from the wheel cylinder WC side to the master cylinder 13 side, but restricting the fluid flow in the reverse direction.

The pressure decrease valve 16b is a normally closed type electromagnetic switching valve for establishing or interrupting fluid communication between the wheel cylinder WC and the reservoir tank 16c. The pressure decrease valve 16b is formed to be a two-positioned valve which becomes in closed condition (condition shown in FIG. 2) when de-energized upon receipt of command from the brake ECU 17 and becomes in open condition when energized.

The reservoir tank 16c is used for reserving brake fluid therein and is in communication with the port 13m of the master cylinder 13. The pump 16d is disposed between the reservoir tank 16c and the master cylinder 13. The pump 16d is in communication with the reservoir tank 16c at the suction port and in communication with the fluid passage between the master cylinder 13 and the holding valve 16a via a check valve 16g at the ejection port. The check valve 16g is a check valve for allowing the fluid flow from the pump 16d to the master cylinder 13 side, but restricting the fluid flow in the reverse direction. The pump 16d is driven by the electric motor 16e which is operated upon receipt of command from the brake ECU. The pump 16d suctions brake fluid in the wheel cylinder WC or the brake fluid reserved in the reservoir tank 16c and returns to the master cylinder 13 upon ABS pressure decrease mode controlling. A damper 16h is provided in the upper stream side of the pump 16d for damping the pulsation of brake fluid ejected from the pump 16d.

The brake hydraulic pressure adjusting device 16 is installed in the vicinity of the wheel W and is provided with a wheel speed sensor 16i. The wheel speed sensor 16i detects a wheel speed and sends a detection signal to the brake ECU 17.

Thus structured brake hydraulic pressure adjusting device 16 executes an ABS control (anti-lock brake control) in which the brake ECU 17 controls to switch over the opening and closing of the electromagnetic valves 16a and 16b based on the master cylinder pressure, wheel speed condition and longitudinal acceleration and operates the electric motor 16e, when necessary, to adjust the brake hydraulic pressure, or the braking force to be applied to the wheel W.

According to the embodiment, when the pressure increase valve 15b2 and the pressure decrease valve 15b1 are de-energized due to a failure of electric system, the first through fourth passages L1 through L4 become in open communication. The passage connecting the reservoir tank 14 (low pressure source) and the drive hydraulic pressure chamber 13e is structured to include the second and the fourth passages L2 and L4 and since the pressure decrease control valve 15b1 is of normally open type control valve, the communication of the passage connecting the low pressure source 14 and the drive hydraulic pressure chamber 13e is not interrupted by the pressure decrease control valve 15b1.

Accordingly, in the regulator 15c (mechanical type pressure modulating portion), the high pressure port 21b, low pressure port 21c, pilot pressure input port 21d and output port 21e are respectively connected to the accumulator 15a1 (high pressure source), reservoir tank 14 (low pressure source), stroke simulator 12 (mechanical type pilot pressure generating portion) and the drive hydraulic pressure chamber 13e and the hydraulic pressure in response to the operating amount of the brake pedal 11 is outputted from the output port 21e. As the result, the hydraulic pressure in the drive hydraulic pressure chamber 13e becomes the pressure corresponding to the operating amount of the brake pedal 11 and thus the master piston 13c and 13d is driven by the hydraulic pressure corresponding to the operating amount of the brake pedal 11.

Thus, when a failure in the electric system occurs, i.e., even when the hydraulic pressure in the drive hydraulic pressure chamber 13e cannot be controlled by the pressure increase control valve 15b2 and the pressure decrease control valve 15b1 and accordingly, the brake fluid cannot be pumped to the accumulator 15a1 by the electric pump 15a2, the braking force corresponding to the operating amount of the brake pedal 11 can be generated, as long as the hydraulic pressure remains in the accumulator 15a1.

Further, the fifth passage L5 is a passage for connecting the accumulator 15a1 and the drive hydraulic pressure chamber 13e bypassing the high pressure port 21b of the regulator 15c. Since the pressure increase control valve 15b2 is a normally open type control valve, the flow of brake fluid from the accumulator 15a1 to the drive hydraulic pressure chamber 13e is interrupted by the pressure increase control valve 15b2 when such failure of electric system occurs.

According to the structure, the consumption of brake fluid in the accumulator 15a1 at the time of failure of electric system can be minimized and the braking force generation continues relatively (compared to the case where a normally open type control valve is used for the pressure increase control valve longer) in the failure of electric system.

On the other hand, when no electric failure occurs and the electric pump 15a2, the pressure increase control valve 15b2 and the pressure decrease control valve 15b1 are operated normally, the regulator 15c is operated similar to the operation under the de-energized condition of the control valves and in addition thereto, the pressure modulation by the pressure increase control valve 15b2 and the pressure decrease control valve 15b1 can be performed.

According to the embodiment explained above, the mechanical type pilot pressure generating portion is formed by the piston 12c cooperatively movable with the brake pedal 11 (brake operating member), the body 12a (cylinder) in which the piston 12c is slidably movable and the hydraulic pressure chamber 12d formed by the piston 12c and the body 1a. The mechanical type pilot pressure generating portion generates the hydraulic pressure in the hydraulic pressure chamber 12d to which the stroke simulator 12e is connected, as a pilot hydraulic pressure. Accordingly, the pilot hydraulic pressure corresponding to the operating amount of the brake pedal 11 can be generated with a simple construction.

Further, according to the embodiment above, the pressure decrease control valve 15b1 is disposed in the second passage L2. By providing the pressure decrease control valve 15b1 in the second passage L2 which flow rate of brake fluid is set to be smaller than the flow rate thereof in the fourth passage L4 instead of providing the pressure decrease control valve 15b1 in the fourth passage L4 which flow rate of brake fluid is set to be larger than the flow rate thereof in the second passage L2, the flow rate of the brake fluid between the drive hydraulic pressure chamber 13e and the regulator 15c (pressure modulating portion) is not restricted to the maximum flow rate of the pressure decrease control valve 15b1.

2) Second Embodiment

Figure 5:
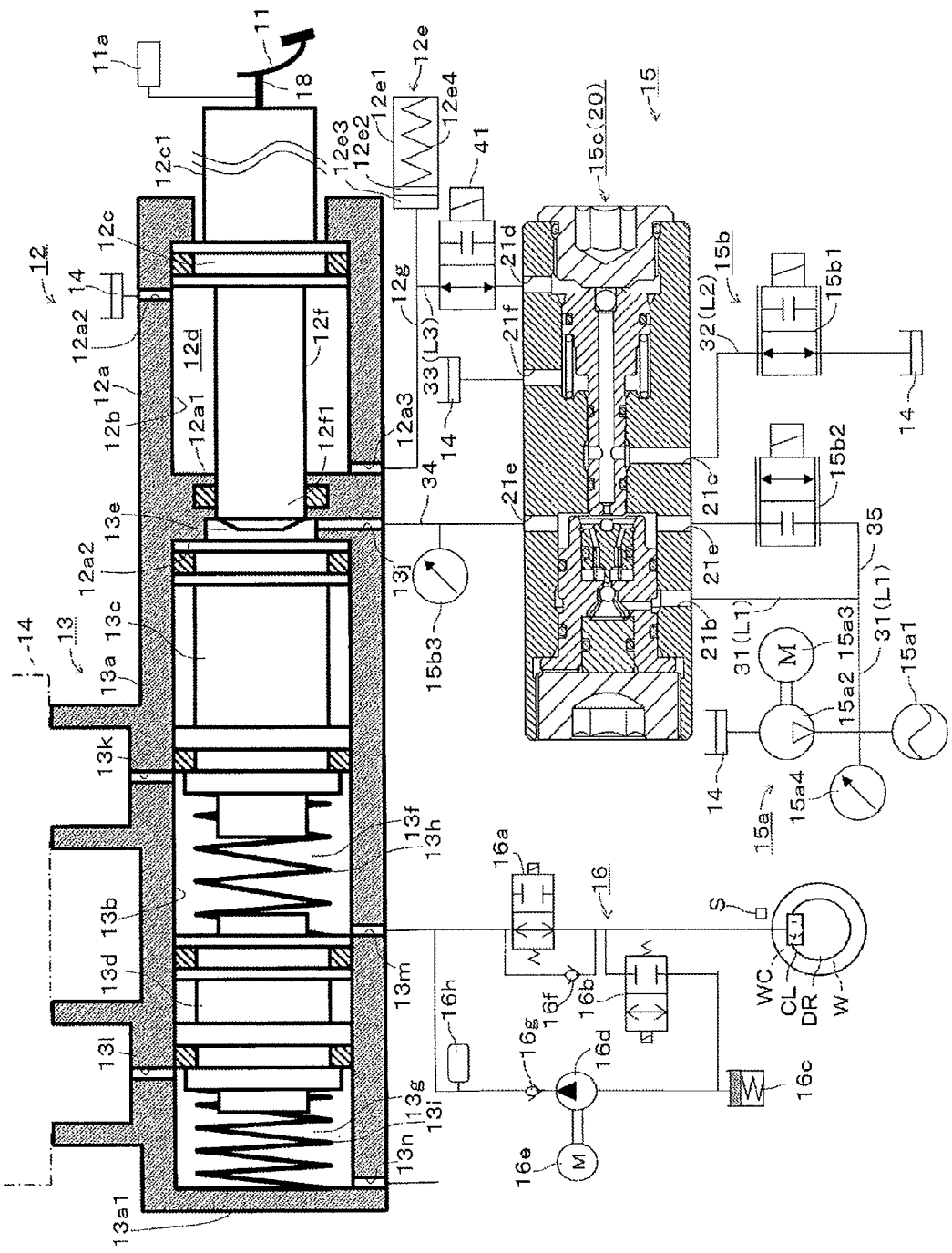
FIG. 5 shows an outline view of the brake device according to the second embodiment of the invention.

Next, the brake device of the present invention according to the second embodiment will be explained with reference to FIG. 5. FIG. 5 shows an outline of the brake device B.

The second embodiment is different from the first embodiment in the provision of the pilot pressure control valve 41. The same structure will be referenced as the same reference numeral and the explanation thereof will be omitted. In detail, the pilot pressure control valve 41 is provided in the hydraulic passage 33 and is a normally open type electromagnetic control valve which controls the flow rate of the brake fluid between the stroke simulator portion 12 (mechanical type pilot pressure generating portion) and the pilot pressure input port 21d. Opening or closing of the pilot pressure control valve 41 is controlled based on a command from the brake ECU 17.

The operation of the brake device of the second embodiment will be explained. When a failure in the electric system occurs, the normally open type pilot pressure control valve 41 is in open condition and the hydraulic pressure chamber 12d of the stroke simulator portion 12 and the pilot pressure input port 21d are in fluid communication. As similar to the case of the first embodiment, as long as a high pressure is supplied from the accumulator 15c, the regulator 15c (mechanical type pressure modulating portion) outputs from the output port 21e the hydraulic pressure corresponding to the pressure applied to the pilot pressure input port 21d by the hydraulic pressure applied to both high and low pressure ports 21b and 21c.

When no electric failure occurs, the brake ECU 17 closes the pilot pressure control valve 41 when a regeneration braking is required. By the closing of the pilot pressure control valve 41, the output hydraulic pressure corresponding to the operating amount of the brake pedal 11 is not applied at the pilot pressure input port 21d from the stroke simulator portion 12 (mechanical type pressure modulating portion) and accordingly, the pressure modulation by the regulator 15c is not performed. Accordingly, the hydraulic pressure in response to the regeneration braking requirement can be applied to the drive hydraulic pressure chamber 13e by the controlling of the pressure increase control valve 15b2 and the pressure decrease control valve 15b1 to achieve a desired regeneration braking operation. As stated above, the required value for the regeneration braking is set for the braking requirement by the operator of the vehicle, i.e., according to the brake operation condition, the brake ECU 17 sets the regeneration requirement in response to the operating amount detected by the pedal stroke sensor 11a. Accordingly, the brake ECU serves as the vehicle condition detecting means for detecting that regeneration is required or not.

Further, when no electric system failure occurs and an anti-lock braking control is being performed, the brake ECU 17 (control means) controls to open the pilot pressure control valve 41. Accordingly, the hydraulic pressure modulated by the regulator 15c and the hydraulic pressure modulated by both pressure increase and pressure decrease control valves 15b2 and 15b1 are supplied due to the opening of the pilot pressure control valve 41. Thus, braking operation can be sufficiently performed even if a large amount of brake fluid is needed for performing the anti-lock braking operation. It is noted as stated above that the brake ECU 17 controls to switch over the opening and closing of the electromagnetic valves 16a and 16b based on the master cylinder pressure, wheel speed condition and longitudinal acceleration and operates the electric motor 16e, when necessary, to adjust the brake hydraulic pressure, or the braking force to be applied to the wheel W. Accordingly, the brake ECU serves as the vehicle condition detecting means for detecting that anti-lock braking operation is being performed or not.

Thus, when no failure in the electric system occurs, the brake ECU as the control means controls the pilot pressure control valve 41 which controls the flow of brake fluid between the stroke simulator portion 12 (mechanical type pilot pressure generating portion) and the pilot pressure input port 21d in response to the vehicle condition detected by the brake ECU 17 which serves as the vehicle condition detecting means. Thus, the pressure modulation in response to the vehicle condition can be properly performed by the regulator 15c.

3) Third Embodiment

Figure 6:
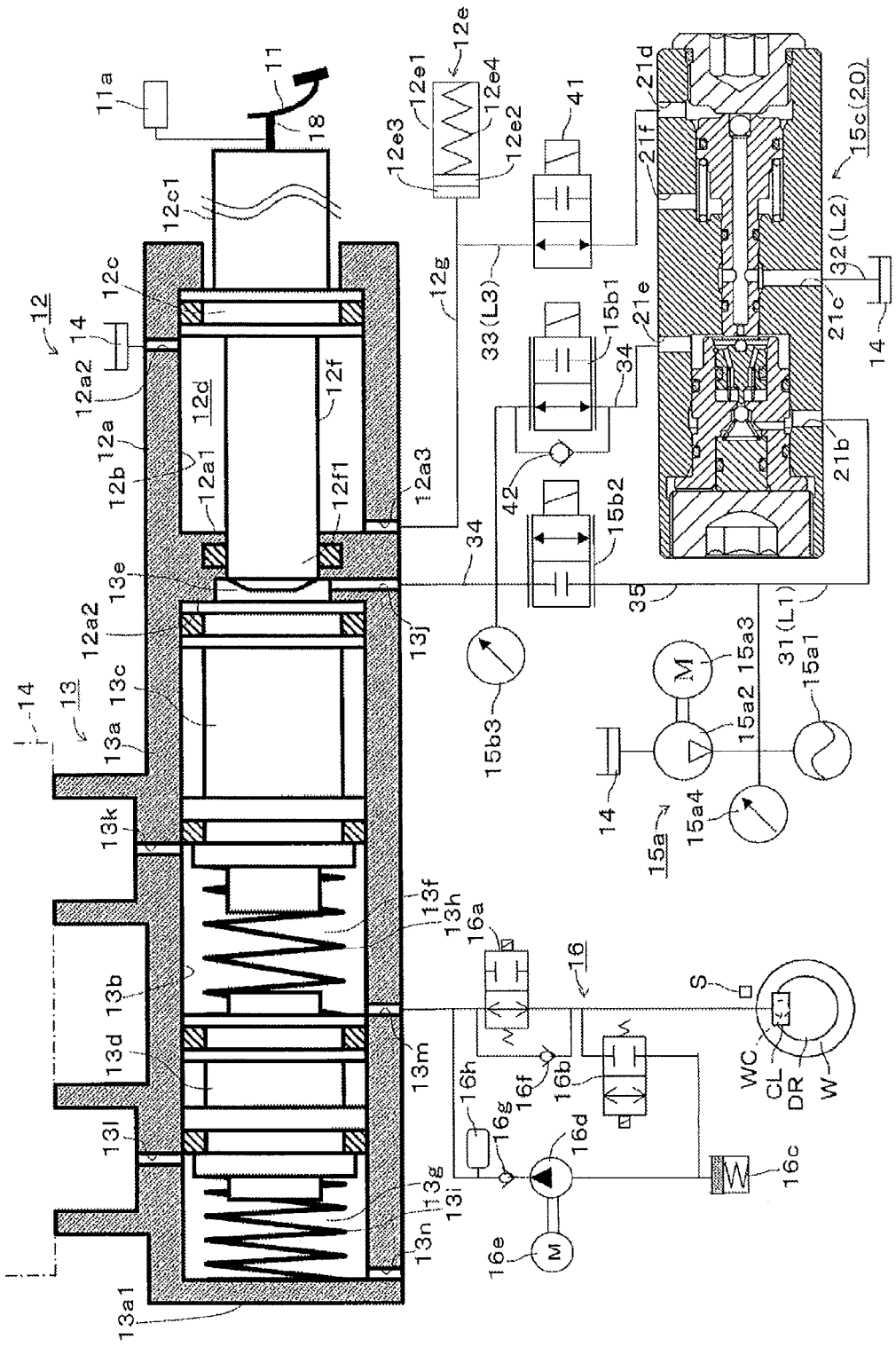
FIG. 6 shows an outline view of the brake device according to the third embodiment of the invention.

Next, the brake device of the present invention according to the third embodiment will be explained with reference to FIG. 6. FIG. 6 shows an outline of the brake device B.

The third embodiment is different from the second embodiment in the points that the pressure decrease control valve 15b1 is provided in the fourth passage L4 between the output port 21a and the drive hydraulic pressure chamber 13e and the check valve 42 is provided in parallel with the pressure decrease control valve 15b1 and that the fifth passage L5 which connects the high pressure source and the drive hydraulic pressure chamber has no regulator provided therebetween. The same structure is referenced as the same reference numeral and the explanation thereof is omitted.

The hydraulic passage 35 is connected to the hydraulic passage 34. The check valve 42 allows the flow of fluid from the regulator 15c to the drive hydraulic pressure chamber 13e, but restricts the flow in opposite direction. The fluid passage area of the check valve 42 is larger than the flow passage area of the pressure decrease control valve 15b1 to earn the flow rate of the brake fluid upon pressure increase operation. It is noted that the operation and the effects of the third embodiment are the same as in the second embodiment.

4) Fourth Embodiment

Figure 7:
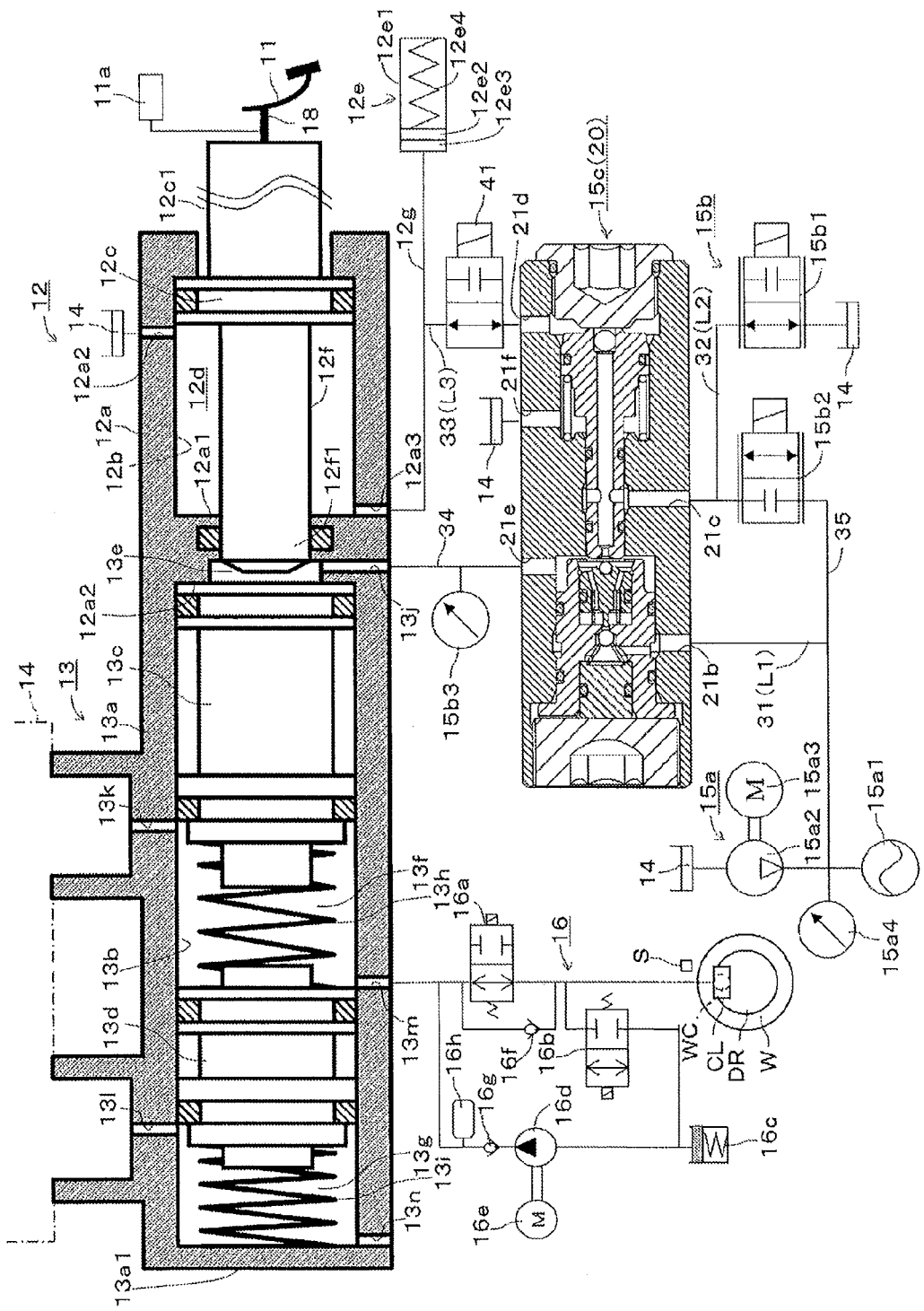
FIG. 7 shows an outline view of the brake device according to the fourth embodiment of the invention.

Next, the brake device of the present invention according to the fourth embodiment will be explained with reference to FIG. 7. FIG. 7 shows an outline of the brake, device B.

The fourth embodiment is different from the second embodiment in the point that the fifth passage L5 is formed to connect drive hydraulic pressure chamber 13e and the accumulator 15a1 through the low pressure port 21c and the output port 21e of the regulator 20. The same structure is referenced as the same reference numeral and the explanation thereof is omitted. The hydraulic passage 35 is connected to the hydraulic passage 32. In this embodiment, the fifth passage L5 is formed by the hydraulic passage 31 (a passage portion between the accumulator 15a1 and a connecting point of the hydraulic passage 35), hydraulic passage 35, hydraulic passage 32 (a passage portion between the connecting point of the hydraulic passage 35 and the low pressure port 21c), low pressure port 21c, communication passage 22c, pressure modulating chamber 20b, output port 21e, hydraulic passage 34 and the port 3j.

5) Fifth Embodiment

Figure 8:
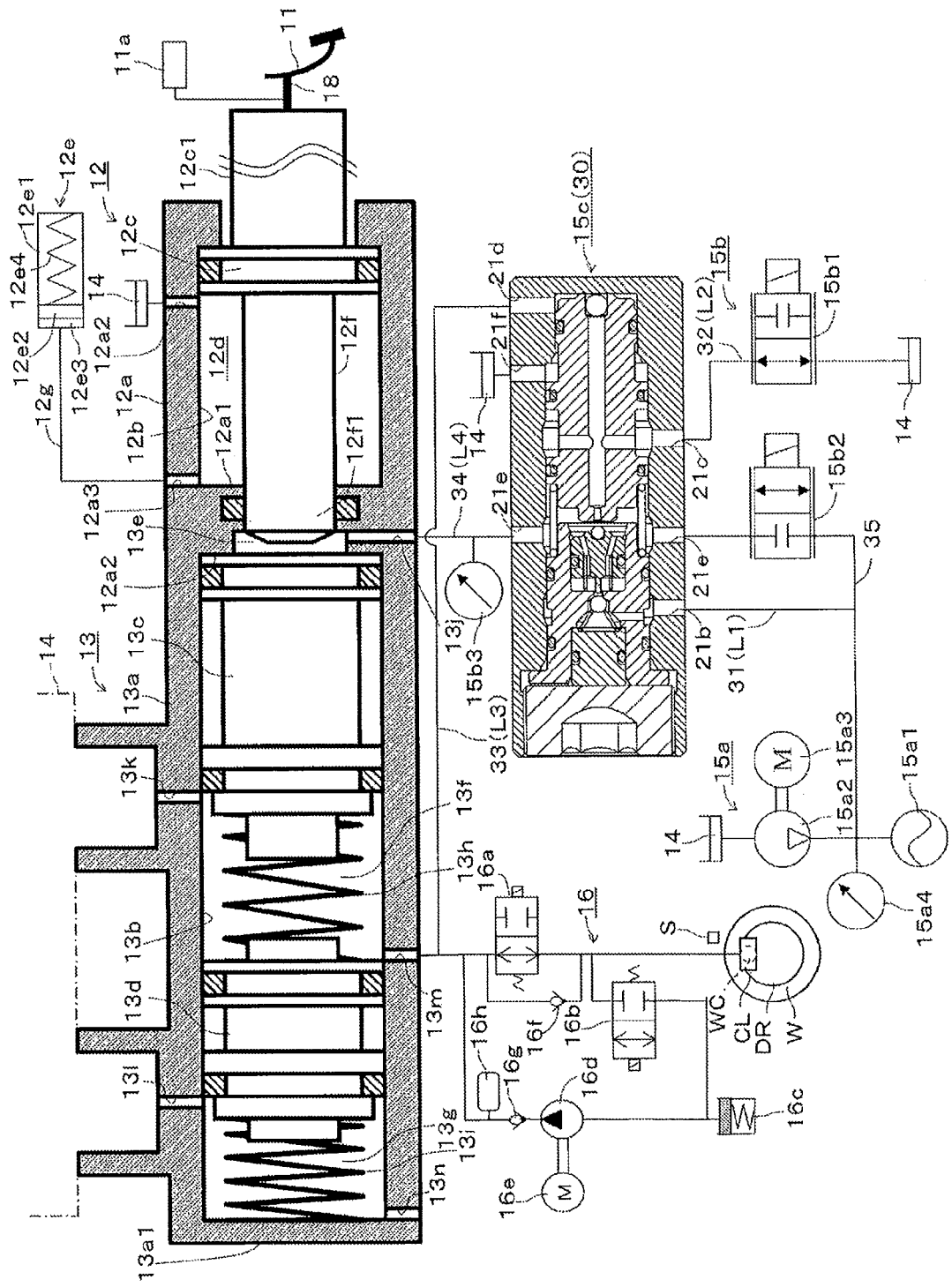
FIG. 8 shows an outline view of the brake device according to the fifth embodiment of the invention.

Next, the brake device of the present invention according to the fifth embodiment will be explained with reference to FIG. 8. FIG. 8 shows an outline of the brake device B.

The fifth embodiment is different from the first embodiment in the point that the first hydraulic pressure chamber 13f is adopted as the mechanical type pilot pressure generating portion. The same structure is referenced as the same reference numeral and the explanation thereof is omitted. In more detail, the mechanical type pilot pressure generating portion is formed by the first piston 13c as the maser piston and the master cylinder 13 in which the master piston 13c is slidably movable. The hydraulic pressure in the first hydraulic pressure chamber 13f as the master chamber formed by the master piston 13c and the master cylinder 13 is generated as the pilot hydraulic pressure. Therefore, no particular construction for generating the pilot hydraulic pressure is needed and existing master cylinder structure can be used, which leads to the downsizing and the cost reduction of the device. It is noted that the second hydraulic pressure chamber 13g of the master cylinder 13 may be used as the mechanical type pilot pressure generating portion.

Figure 9:
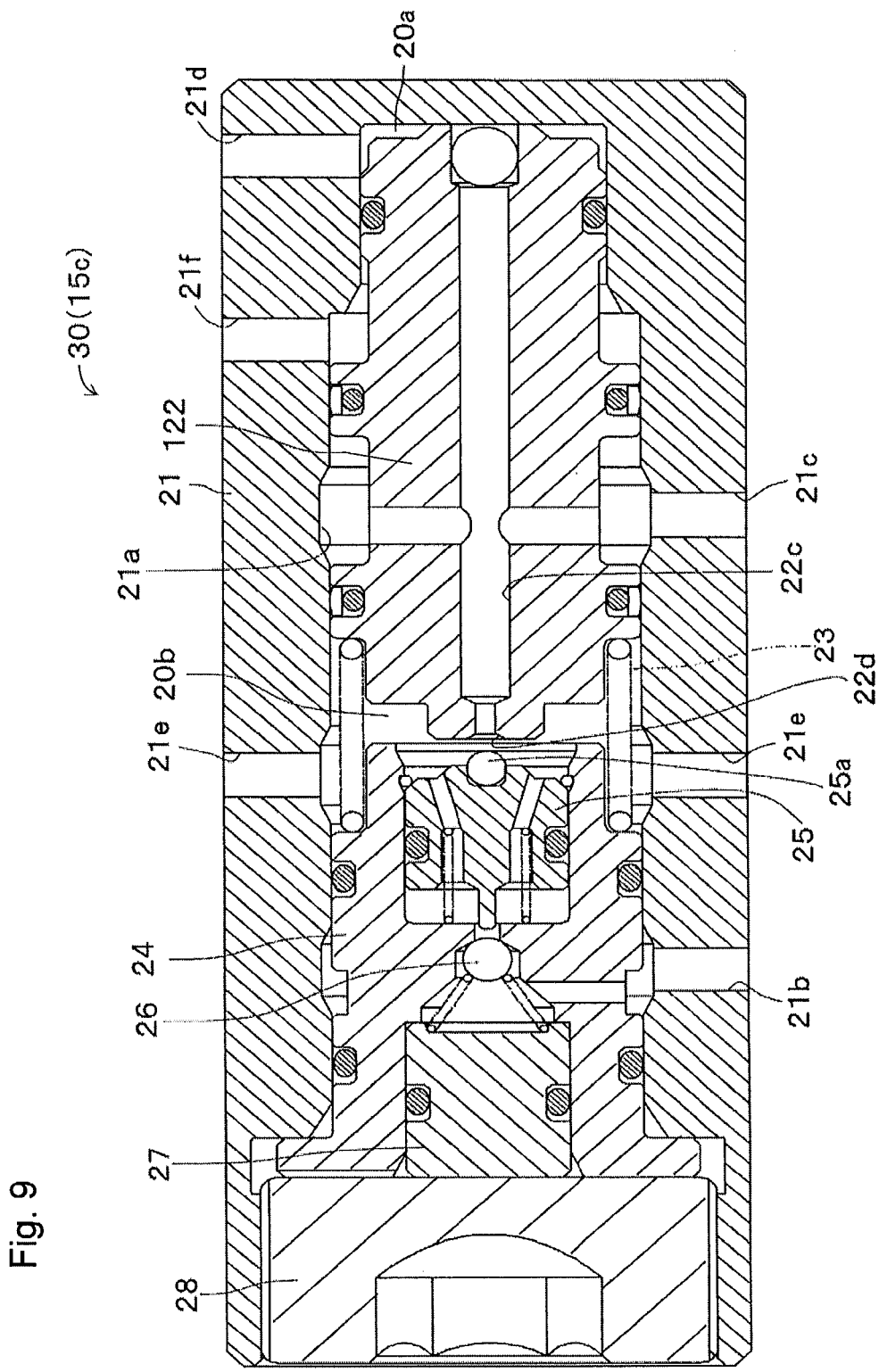
FIG. 9 is a cross sectional view of the regulator in FIG. 8 showing that no pilot pressure is applied thereto.

In such case, the regulator 30 shown in FIG. 9 is preferably used for the regulator 15c. The regulator 30 is different from the regulator 20 in structure that one end surface (right end surface in Figure) area of the piston 122 exposing to the pilot hydraulic pressure chamber 20a is smaller than the other end surface (left end surface in Figure) area exposing to the pressure modulating chamber 20b. The same structure is referenced as the same reference numeral and the explanation thereof is omitted.

The hydraulic pressure in the pilot hydraulic pressure chamber 20a and the hydraulic pressure in the first hydraulic pressure chamber 13f are the same and the hydraulic pressure in the pressure modulating chamber 20b and the hydraulic pressure in the drive hydraulic pressure chamber 13e are the same in the regulator 30. Further, the regulator 30 is structured that the force of the hydraulic pressure in the drive hydraulic pressure chamber 13e acting on the first piston 13c in the left direction as viewed in Figure is set to be smaller than the force of the hydraulic pressure in the first hydraulic pressure chamber 13f acting on the first piston 13c in the right direction. In this case, each pressure receiving area of each piston end is approximately the same. Even the pressure receiving area of one end is different from the pressure receiving area of the other end of the piston 13c, it is preferable that the force of the hydraulic pressure in the drive hydraulic pressure chamber 13e acting on the first piston 13c in the left direction as viewed in Figure is set to be smaller than the force of the hydraulic pressure in the first hydraulic pressure chamber 13f acting on the first piston 13c in the right direction.

The operation of the invention according to the fifth embodiment will be explained. When the pressure increase valve 15b2 and the pressure decrease valve 15b1 are de-energized due to a failure of electric system, the first through fourth passages L1 through L4 become in open communication. The passage connecting the reservoir tank 14 (low pressure source) and the drive hydraulic pressure chamber 13e is structured to include the second and the fourth passages L2 and L4 and since the pressure decrease control valve 15b1 is of normally open type control valve, the communication of the passage connecting the low pressure source 14 and the drive hydraulic pressure chamber 13e is not interrupted by the pressure decrease control valve 15b1. Accordingly, in the regulator 15c (mechanical type pressure modulating portion), the high pressure port 21b, low pressure port 21c, pilot pressure input port 21d and output port 21e are respectively connected to the accumulator 15a1 (high pressure source), reservoir tank 14 (low pressure source), first hydraulic pressure chamber 13f of the master cylinder (mechanical type pilot pressure generating portion) and the drive hydraulic pressure chamber 13e.

When the brake pedal 11 (brake operating member) is operated, a master cylinder pressure is established in the first hydraulic pressure chamber by the direct pushing of the rod 12f to the first piston 13c before starting of the supply of regulator pressure by the regulator 15c. When the master cylinder pressure is supplied from the first hydraulic pressure chamber 13f, the master cylinder pressure (pilot hydraulic pressure) in response to the operating amount of the brake pedal 11 is inputted to the pilot pressure input port 21d. Thus, the regulator 15c outputs the hydraulic pressure (regulator pressure) corresponding to the inputted pressure.

As the result, the hydraulic pressure in the drive hydraulic pressure chamber 13e becomes the pressure corresponding to the operating amount of the brake pedal 11 and thus the master piston 13c and 13d is driven by the hydraulic pressure corresponding to the operating amount of the brake pedal 11. Thus, when a failure in the electric system occurs, i.e., even when the hydraulic pressure in the drive hydraulic pressure chamber 13e cannot be controlled by the pressure increase control valve 15b2 and the pressure decrease control valve 15b1 and accordingly, the brake fluid cannot be pumped to the accumulator 15a1 by the electric pump 15a2, the braking force corresponding to the operating amount of the brake pedal 11 can be generated, as long as the hydraulic pressure remains in the accumulator 15a1.

On the other hand, when no failure in the electric system occurs and the electric pump 15a2, pressure increase control valve 15b2 and the pressure decrease control valve 15b1 are normally operated, before the start of supply of the regulator pressure by the regulator 15c, the master cylinder pressure (pilot pressure) corresponding to the operating amount of the brake pedal 11 by the operation of the pressure increase control valve 15b2 and the pressure decrease control valve 15b1 is inputted to the pilot pressure input port 21d. As explained above, since the regulator 15c is operated, the pressure modulating is performed by the regulator 15c in addition to the pressure modulating by the pressure increase control valve 15b2 and the pressure decrease control valve 15b1.

Although in the above embodiments, the invention is applied to the brake device equipped in the hybrid vehicle, the invention can be also applied to the brake device for a vehicle installed with engine only.

The invention can be applied not only to a brake device with only ABS control, but also to a brake device with ESC control. The brake device with ESC control is a brake device wherein a pressure differential control valve is disposed between the master cylinder 13 and the brake hydraulic pressure adjusting device 16 in the brake device of the first embodiment.

Applicability for Industry

The brake device of the present invention is suitable for a brake system in which the braking force corresponding to the operating amount of the brake operating member can be generated even when a failure occurs in the electric system as long as a hydraulic pressure remains in the high pressure source.

EXPLANATION OF REFERENCE NUMERALS

In the drawings:

1: engine, 2: motor, 3: power split mechanism, 4: power transmitting mechanism, 5: generator, 6: inverter, 7: battery, 8: engine ECU, 9: hybrid ECU, 11: brake pedal (brake operating member), 11*a*: pedal stroke sensor, 12: stroke simulator portion (mechanical type pilot pressure generating portion), 13: master cylinder (mechanical type pilot pressure generating portion), 13*c*: first piston (master piston), 13*e*: drive hydraulic pressure chamber), 14: reservoir tank (low pressure source), 15: drive hydraulic pressure adjusting device, 15*a*: pressure supply device, 15*a*1: accumulator (high pressure source), 15*a*2: pump (electric pump), 15*a*3: electric motor, 15*b*: electric type pressure modulating portion, 15*b*1: pressure decrease control valve, 15*b*2: pressure increase control valve, 15*c*, 20: regulator (mechanical type pressure modulating portion), 321*b*: high pressure port, 21*c*: low pressure port, 21*d*: pilot pressure input port, 21*e*: output port, 16: brake hydraulic pressure adjusting device, 17: brake ECU (control means, vehicle condition detecting means), 41: pilot pressure control valve, A: regeneration brake device, B: brake device.

The invention claimed is:

1. A brake device comprising:
a drive hydraulic pressure chamber for driving a master piston;
a high pressure source accumulating the hydraulic pressure of brake fluid pumped from an electric pump;
a low pressure source reserving a pressure lower than the pressure accumulated in the high pressure source;
a pressure increase control valve provided in a passage connecting the high pressure source and the drive hydraulic pressure chamber and controlling a brake fluid flow from the high pressure source to the drive hydraulic pressure chamber; and
a pressure decrease control valve provided in a passage connecting the low pressure source and the drive hydraulic pressure chamber and controlling a brake fluid flow from the drive hydraulic pressure chamber to the low pressure source, thereby to control the hydraulic pressure of the drive hydraulic pressure chamber by controlling the pressure increase control valve and the pressure decrease control valve, wherein the brake device further comprises:
a mechanical pilot pressure generating portion generating a pilot hydraulic pressure in response to a brake operating member;
a mechanical pressure modulating portion having a high pressure port connected to the high pressure source, a low pressure port connected to the low pressure source, a pilot pressure input port connected to the mechanical pilot pressure generating portion and an output port connected to the drive hydraulic pressure chamber, wherein a hydraulic pressure is outputted from the output port in response to the pressure applied to the pilot pressure input port by the hydraulic pressure applied to both high pressure and the low pressure ports;
a first passage connecting the high pressure source and the high pressure port;
a second passage connecting the low pressure source and the low pressure port;
a third passage for connecting the mechanical pilot pressure generating portion and the pilot pressure input port;
a fourth passage for connecting the drive hydraulic pressure chamber and the output port; and
a fifth passage provided as the passage for connecting the high pressure source and the drive hydraulic pressure chamber and connecting the high pressure source and the drive hydraulic pressure chamber by bypassing the high pressure port of the pressure modulating portion, wherein
the passage connecting the low pressure source and the drive hydraulic pressure chamber is formed to comprise the second passage and the fourth passage,
the pressure decrease control valve is formed to be a normally open control valve provided in the second passage or in the fourth passage,
the pressure increase control valve is formed to be a normally closed control valve provided in the fifth passage, and
wherein the fluid communications of the first through fourth passages are established when the pressure increase control valve and the pressure decrease control valve are in de-energized condition.

2. The brake device according to claim 1, further including:
a normally open pilot pressure control valve provided in the third passage and controlling the brake fluid flow between the mechanical pilot pressure generating portion and the pilot pressure input port,
a vehicle condition detecting means for detecting a predetermined vehicle condition and
a control means for controlling the pilot pressure control valve in response to a detected result of the vehicle condition detected by the vehicle condition detecting means.

3. The brake device according to claim 2, wherein
the vehicle condition detecting means detects that a regeneration is required and
the control means closes the pilot pressure control valve when the vehicle condition detecting means detects that the regeneration has been required.

4. The brake device according to claim 2, wherein
the vehicle condition detecting means detects that an anti-lock brake controlling is being performed; and
the control means opens the pilot pressure control valve when the vehicle condition detecting means detects that the anti-lock brake controlling is being performed.

5. The brake device according to claim 1, wherein
the pressure decrease control valve is provided in the second passage.

6. The brake device according to claim 1, wherein
the mechanical pilot pressure generating portion is formed to have a piston movable in cooperation with the brake operating member and a cylinder in which the piston is slidably movable, whereby a hydraulic pressure in a hydraulic pressure chamber, to which a stroke simulator formed by a piston and a cylinder is connected, is generated as a pilot hydraulic pressure.

7. The brake device according to claim 1, wherein
the mechanical pilot pressure generating portion is formed to have the master piston and a master cylinder in which the piston is slidably movable, whereby a hydraulic pressure in a master chamber formed by the master piston and the master cylinder is generated as a pilot hydraulic pressure.

* * * * *